United States Patent
Isobe et al.

(10) Patent No.: US 12,215,061 B2
(45) Date of Patent: Feb. 4, 2025

(54) INSERT AND CUTTING TOOL

(71) Applicant: KYOCERA CORPORATION, Kyoto (JP)

(72) Inventors: Futoshi Isobe, Satsumasendai (JP); Azusa Hagihara, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 537 days.

(21) Appl. No.: 17/622,714

(22) PCT Filed: Jun. 24, 2020

(86) PCT No.: PCT/JP2020/024849
§ 371 (c)(1),
(2) Date: Dec. 24, 2021

(87) PCT Pub. No.: WO2020/262468
PCT Pub. Date: Dec. 30, 2020

(65) Prior Publication Data
US 2022/0259109 A1 Aug. 18, 2022

(30) Foreign Application Priority Data
Jun. 27, 2019 (JP) ................... 2019-120063

(51) Int. Cl.
*C04B 35/5831* (2006.01)
*B23B 27/16* (2006.01)

(52) U.S. Cl.
CPC ...... *C04B 35/5831* (2013.01); *B23B 27/1611* (2013.01); *C04B 2235/386* (2013.01); *C04B 2235/5445* (2013.01); *C04B 2235/762* (2013.01)

(58) Field of Classification Search
None
See application file for complete search history.

(56) References Cited

U.S. PATENT DOCUMENTS 5,618,509 A * 4/1997 Shioi ................... C04B 35/5831
423/290
6,071,841 A * 6/2000 Sumiya ............... C01B 21/0645
501/96.4

(Continued)

FOREIGN PATENT DOCUMENTS

| JP | 5929655 B2 | 6/2016 |
| JP | 7142165 B2 | 9/2022 |
| WO | 2019244894 A1 | 12/2019 |

OTHER PUBLICATIONS

Fukunaga, O; "The equilibrium phase boundary between hexagonal and cubic boron nitride", 1999, Diamond and Related Materials, vol. 9, pp. 7-12 (Year: 1999).*

*Primary Examiner* — Seth Dumbris
(74) *Attorney, Agent, or Firm* — HAUPTMAN HAM, LLP

(57) ABSTRACT

An insert of the present disclosure includes a boron nitride sintered body including a first surface. In a transmission X-ray diffraction of a cross section of the boron nitride sintered body vertical to the first surface, X-ray intensity at a top of a 111 diffraction peak of cubic boron nitride in a direction vertical to the first surface is IcBN(111)v. X-ray intensity at a top of a 002 diffraction peak of compressed boron nitride is IhBN(002)v. X-ray intensity at a top of a 111 diffraction peak of the cubic boron nitride in a direction parallel to the first surface is IcBN(111)h. X-ray intensity at a top of a 002 diffraction peak of the compressed boron nitride is IhBN(002)h. A compressed boron nitride content value obtained from these X-ray intensities is larger than 0.005. A cubic orientation value is larger than 0.5, and a compressed boron nitride orientation value is larger than the cubic orientation value.

6 Claims, 3 Drawing Sheets

(56) References Cited

U.S. PATENT DOCUMENTS

| | | | |
|---|---|---|---|
| 2003/0170161 A1* | 9/2003 | Iizuka | C04B 35/583 423/290 |
| 2009/0130434 A1 | 5/2009 | Zhu et al. | |
| 2020/0247673 A1 | 8/2020 | Hirano et al. | |
| 2022/0259109 A1 | 8/2022 | Isobe et al. | |

* cited by examiner

INSERT AND CUTTING TOOL

RELATED APPLICATIONS

The present application is a National Phase of International Application No. PCT/JP2020/024849 filed Jun. 24, 2020, which claims priority to Japanese Application No. 2019-120063, filed Jun. 27, 2019.

TECHNICAL FIELD

The present disclosure relates to an insert and a cutting tool.

BACKGROUND

A boron nitride sintered body has high hardness. The boron nitride sintered body is applied to, for example, inserts for crushing members and tools by taking advantage of characteristic thereof. Patent Document 1 describes a boron nitride sintered body including cubic boron nitride. Patent Document 1 also describes a cubic boron nitride complex polycrystalline substance which includes Wurtzite-type boron nitride and includes an orientation plane that is less than 0.1 in terms of ratio $I_{(220)}/I_{(111)}$ of X-ray diffraction intensity $I_{(220)}$ of a (220) plane of cubic boron nitride to X-ray diffraction intensity of $I_{(111)}$ of a (111) plane of cubic boron nitride. In other words, the $I_{(111)}$ is not less than ten times the $I_{(220)}$ of the orientation plane of the cubic boron nitride complex polycrystalline substance. That is, it can be said that the (111) plane is strongly oriented in the orientation planes. The cubic boron nitride complex polycrystalline substance is obtainable by using oriented pBN as a raw material. There is also a description that if including a hexagonal boron nitride as a comparative example, an amount of wear is large and performance as a cutting tool is poor even if the (111) plane is strongly oriented in the orientation planes of cubic boron nitride.

RELATED ART DOCUMENT

Patent Document

Patent Document 1: Japanese Patent 5929655

SUMMARY

Problems to be Solved by the Invention

An insert and a cutting tool are provided which are excellent in wear resistance.

Means of Solving the Problem

An insert of the present disclosure includes a boron nitride sintered body including a first surface, a second surface, and a cutting edge located on at least a part of a ridge part of the first surface and the second surface. The boron nitride sintered body includes cubic boron nitride and compressed boron nitride. In a transmission X-ray diffraction of a cross section of the boron nitride sintered body vertical to the first surface, X-ray intensity at a top of a 111 diffraction peak of the cubic boron nitride is IcBN(111)v, and X-ray intensity at a top of a 002 diffraction peak of the compressed boron nitride is IhBN(002)v in a direction vertical to the first surface. X-ray intensity at a top of a 111 diffraction peak of the cubic boron nitride is IcBN(111)h, and X-ray intensity at a top of a 002 diffraction peak of the compressed boron nitride is IhBN(002)h in a direction parallel to the first surface. A compressed boron nitride content value indicated by (IhBN(002)v+IhBN(002)h)/(IcBN(111)v+IcBN(111)h) is larger than 0.002 and smaller than 0.01. A cubic orientation value indicated by IcBN(111)v/(IcBN(111)v+IcBN(111)h) is larger than 0.5. A compressed boron nitride orientation value indicated by IhBN(002)v/(IhBN(002)v+IhBN(002)h) is larger than the cubic orientation value. A cutting tool of the present disclosure includes a holder which has a length from a first end to a second end and includes a pocket on a side of the first end, and the insert located in the pocket.

EMBODIMENT

Boron nitride sintered bodies, inserts and cutting tools in the present disclosure are described in detail below with reference to the drawings. These drawings referred to in the following illustrate, in simplified form, only main components necessary for convenience of description.

<Inserts>

Figure 1:
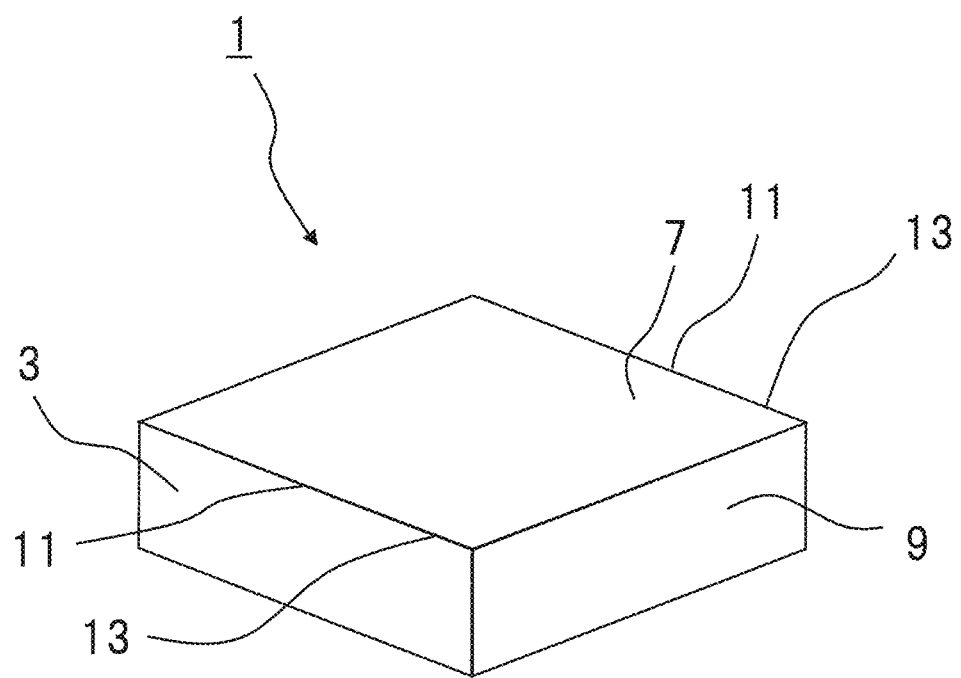
FIG. 1 is a perspective view illustrating an embodiment of inserts of the present disclosure.
Figure 2:
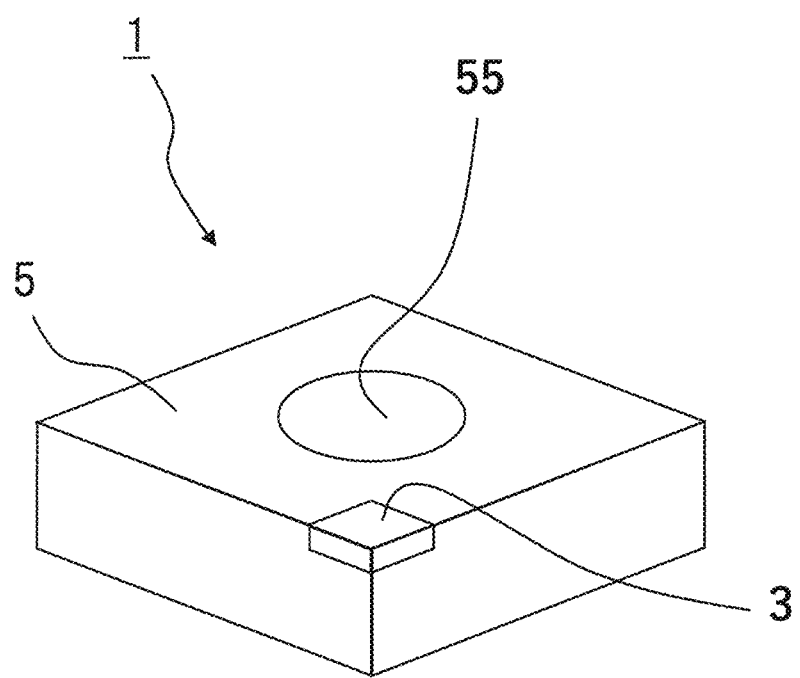
FIG. 2 is a perspective view illustrating other embodiment of the inserts of the present disclosure.

FIG. 1 illustrates one embodiment of the inserts 1 of the present disclosure. The insert 1 is a boron nitride sintered body 3 having a polygonal shape in the embodiment of FIG. 1. FIG. 2 illustrates other embodiment of the inserts 1 of the present disclosure. The boron nitride sintered body 3 is joined to a base 5 composed of cemented carbide in the embodiment of FIG. 2. The base 5 and the boron nitride sintered body 1 are joined together to constitute the insert having the polygonal shape. This configuration makes it possible to decrease a proportion of the boron nitride sintered body 3 being relatively expensive in the insert 1. Although the boron nitride sintered body 3 is located on one of corner parts of the insert 1 in the embodiment of FIG. 2, the boron nitride sintered body 3 may be located on each of the corner parts.

For example, a joining material (not illustrated) including Ti or Ag may be located between the boron nitride sintered body 3 and the base 5. The boron nitride sintered body 3 and the base 5 can be integrated with the joining material interposed therebetween by using a conventionally known joining method.

The boron nitride sintered body 3 includes a first surface 7 and a second surface 9 in the insert 1 of the present disclosure. An upper surface is the first surface 7, and a lateral surface is the second surface in the embodiments illustrated in FIGS. 1 and 2. The first surface 7 is a rake surface 7 and the second surface 9 is a flank surface 9 in these embodiments. Hereinafter, the first surface 7 is also referred to as the rake surface 7, and the second surface 9 is also referred to as the flank surface 9. The insert 1 includes a cutting edge 13 on at least a part of a ridgeline 11 of the first surface 7 and the second surface 9.

The boron nitride sintered body 3 includes cubic boron nitride and compressed boron nitride in the insert 1 of the present disclosure. Data are obtained by transmission X-ray diffraction of a cross section vertical to the first surface 7 in the boron nitride sintered body 3. Of the obtained data, X-ray intensity of 111 diffraction of the cubic boron nitride is IcBN(111)v, X-ray intensity of 002 diffraction of the compressed boron nitride is IhBN(002)v in a direction vertical to the first surface 7, and X-ray intensity of 111 diffraction of the cubic boron nitride is IcBN(111)h, and X-ray intensity of 002 diffraction of the compressed boron nitride is IhBN (002) h in a direction parallel to the first surface 7.

Identification of planes in cubic boron nitride is made on the basis of JCPDS card No. 01-075-6381. Identification of planes in compressed boron nitride is made on the basis of JCPDS card No. 18-251. Identification of the planes in hexagonal boron nitride is made on the basis of JCPDS card No. 00-045-0893. Identification of planes in Wurtzite-type boron nitride described later is made on the basis of JCPDS card No. 00-049-1327.

The transmission X-ray diffraction may be carried out using, for example, a curved IPX-ray diffractometer "RINT RAPID2" manufactured by Rigaku Corporation.

(IhBN(002)v+IhBN (002)h)/(IcBN(111)v+IcBN(111)h) obtained on the basis of each of the X-ray intensities is a compressed boron nitride content value. The compressed boron nitride content value is an index related to a content of the compressed boron nitride included in the boron nitride sintered body 3. A larger value of the index leads to a larger content of the compressed boron nitride included in the boron nitride sintered body 3. The compressed boron nitride content value is not the content itself.

The compressed boron nitride content value is larger than 0.002 and smaller than 0.01 in the boron nitride sintered body 3 in the insert 1 of the present disclosure. That is, the boron nitride sintered body 3 in the insert 1 of the present disclosure includes the compressed boron nitride to the extent that this condition is satisfied.

IcBN(111)v/(IcBN(111)v+IcBN(111)h) obtained on the basis of the above individual X-ray intensities is a cubic orientation value. If the cubic orientation value is 0.5, a 111 plane of the cubic boron nitride is oriented in a random direction and is in a non-oriented state. A larger cubic orientation value leads to a larger degree that the 111 plane of the cubic boron nitride included in the boron nitride sintered body 3 is oriented parallel to the first surface 7.

The boron nitride sintered body 3 in the insert 1 of the present disclosure has a cubic orientation value exceeding 0.5. In other words, the X-ray intensity at a top of a 111 diffraction peak of the cubic boron nitride in a vertical direction is larger than X-ray intensity at a top of a 111 diffraction peak of the cubic boron nitride in a parallel direction. That is, it can also be said that the 111 plane of the cubic boron nitride is oriented along a normal direction of the first surface 7.

IhBN(002)v/(IhBN(002)v+IhBN(002)h)obtained on the basis of the above individual X-ray intensities is a compressed boron nitride orientation value. If the compressed boron nitride orientation value is 0.5, a 002 plane of the compressed boron nitride is oriented in a random direction and is in a non-oriented state. A larger compressed boron nitride orientation value leads to a larger degree that the 002 plane of the compressed boron nitride included in the boron nitride sintered body 3 is oriented parallel to the first surface 7.

The compressed boron nitride orientation value is larger than the cubic orientation value in the boron nitride sintered body 3 in the insert 1 of the present disclosure. That is, the 002 plane of the compressed boron nitride has a larger degree of being oriented parallel to the first surface 7 than the 111 plane of the cubic boron nitride.

The insert 1 of the present disclosure offers excellent wear resistance by having the above configuration. This effect seems to be because the insert 1 of the present disclosure includes a small amount of compressed boron nitride and a large number of the 002 planes of the compressed boron nitride in the first surface, and therefore a workpiece welded to the first surface is peeled off together with the compressed boron nitride.

The boron nitride sintered body 3 may have a compressed boron nitride content value of 0.004-0.008 in the insert 1 of the present disclosure. This configuration leads to high hardness of the insert 1.

The boron nitride sintered body 3 may have a cubic orientation value of 0.55 or more in the insert 1 of the present disclosure. This configuration leads to high hardness of the rake surface 7.

The boron nitride sintered body 3 may have a compressed boron nitride orientation value of 0.8 or more in the insert 1 of the present disclosure. This configuration leads to a long life of the insert 1.

The boron nitride sintered body 3 may include Wurtzite-type boron nitride in the insert 1 of the present disclosure. The boron nitride sintered body 3 having this configuration has high hardness.

A mean particle diameter of the cubic boron nitride may be 200 nm or less in the insert 1 of the present disclosure. This configuration leads to high strength of the insert 1. The mean particle diameter of the cubic boron nitride may be 100 nm or less.

Alternatively, a hard coating layer (not illustrated) may be located on a surface of the boron nitride sintered body 3 in the insert 1 of the present disclosure.

<Cutting Tools>

A cutting tool of the present disclosure is described below with reference to the drawings.

Figure 3:
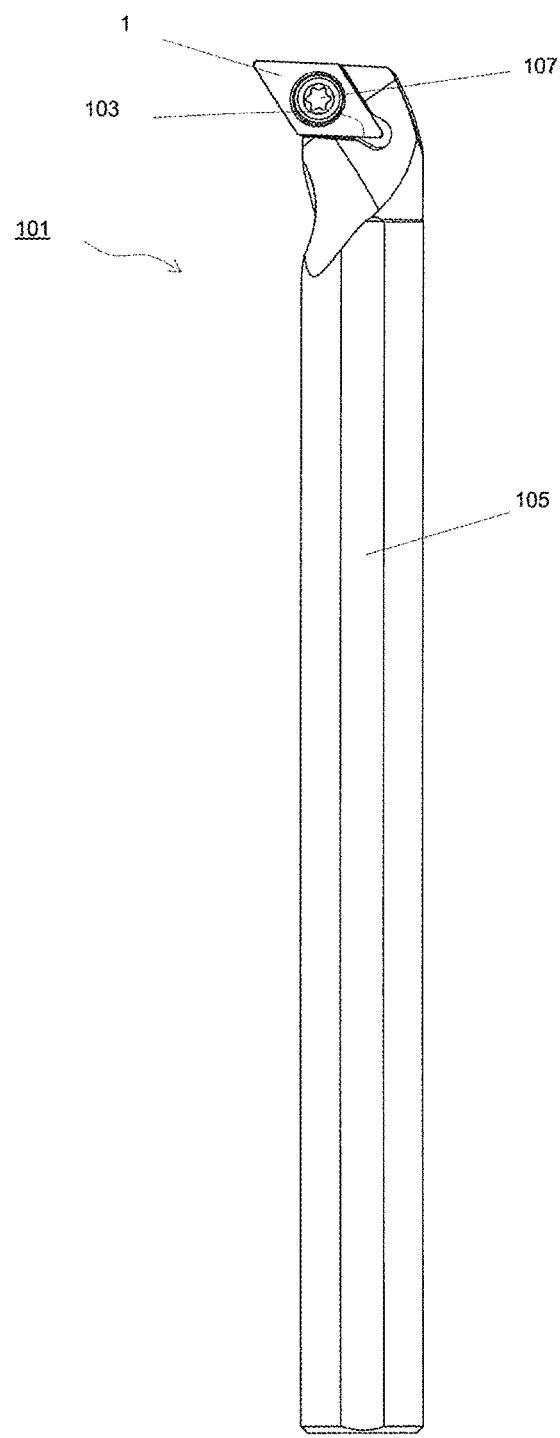
FIG. 3 is a front view illustrating an embodiment of cutting tools of the present disclosure.

As illustrated in FIG. 3, the cutting tool 101 of the present disclosure is, for example, a bar-shaped body extended from a first end (an upper end in FIG. 3) toward a second end (a lower end in FIG. 3).

As illustrated in FIG. 3, the cutting tool 101 includes a holder 105 having a length from the fist end (front end) to the second end and including a pocket 103 located on a side of the first end, and the insert 1 located in the pocket 103. The cutting tool 101 includes the insert 1, and is therefore capable of carrying out a stable cutting process for a long period of time.

The pocket 103 is a part that permits attachment of the insert 1. The pocket 103 includes a seating surface parallel to a lower surface of the holder 105, and a constraining lateral surface vertical or inclined relative to the seating surface. The pocket 103 opens into a side of the first end of the holder 105.

The insert 1 is located in the pocket 103. A lower surface of the insert 1 may be in a direct contact with the pocket 103. Alternatively, a sheet (not illustrated) may be held between the insert 1 and the pocket 103.

The insert 1 is attached to the holder 105 so that at least a part of a ridgeline where the rake surface 7 intersects with the flank surface 9, which is usable as the cutting edge 13, is protruded outward from the holder 105. The insert 1 is attached to the holder 105 with a screw 107 in the present embodiment. Specifically, the insert 1 is attached to the holder 105 in such a manner that screw parts are engaged with each other by inserting the screw 107 into a through hole 55 of the insert 1, and by inserting a front end of the screw 107 into a screw hole (not illustrated) formed in the pocket 103.

For example, steel and cast iron are usable as a material of the holder 105. Of these materials, highly tough steel may be used.

The present embodiment illustrates and describes the cutting tool for use in a so-called turning process. Examples of the turning process include inner diameter processing, outer diameter processing and grooving process. The cutting tool is not limited to one which is used for the turning process. For example, the inserts 1 of the above embodiments may be used for cutting tools used in a milling process.

<Manufacturing Methods>

A method for manufacturing a boron nitride sintered body in the insert of the present disclosure is described below. Firstly, hexagonal boron nitride powder is prepared which is a raw material powder and is flat in shape. There is used one of conventional raw materials whose mean particle diameter is 0.7 μm or more and whose oxygen impurity content is less than 0.5 mass %. The mean particle diameter of the hexagonal boron nitride powder denotes a mean value of lengths in a long axis direction of the boron nitride powder measured with an electron microscope. The hexagonal boron nitride powder may have a mean particle diameter of 0.2-30 μm. The hexagonal boron nitride powder may be of high purity whose purity is 99% or more. The hexagonal boron nitride powder may include a catalyst component used for manufacturing cubic boron nitride powder. Alternatively, a raw material powder having purity of less than 99% may be used.

A cubic orientation value and a compressed boron nitride orientation value after sintering are controllable by molding the raw material powder with uniaxial pressing, and by controlling a pressure during the molding. The hexagonal boron nitride powder being flat is oriented during the molding with uniaxial pressing, and the 002 plane of the hexagonal boron nitride powder is oriented so as to be vertical to a pressurizing axis direction of the pressing. Higher orientation of the hexagonal boron nitride powder in a molded body is attainable by carrying out the uniaxial pressing so that the identical molded body is subjected to repetitive pressure.

The boron nitride sintered body of the present disclosure is obtainable by sintering the molded body manufactured with the above method at a temperature of 1800-2200 degrees and a pressure of 8-10 GPa. A proportion of the compressed boron nitride included in a boron nitride sintered body is controllable by the temperature and pressure during the sintering.

While the boron nitride sintered bodies, inserts and cutting tools in the present disclosure have been described above, there is no intention to limit to the foregoing embodiments. Various improvements and changes may be made without departing from the scope of the present disclosure.

Examples

Molded bodies were obtained by uniaxial pressing of hexagonal boron nitride powders being flat in shape whose mean particle diameters were respectively 0.3 μm, 6 μm and 16 μm, and whose oxygen impurity content was 0.3 mass %. Molded bodies were manufactured by pressurizing identical hexagonal boron nitride powders with uniform pressure. These molded bodies were sintered under conditions presented in Table 1.

Subsequently, obtained sintered bodies were cut out in a direction vertical to the first surface of the sintered bodies, thereby manufacturing test pieces each of which included a surface intersecting with the first surface at right angles and had a thickness of approximately 0.5 mm. Using the curved IP X-ray diffractometer RINT RAPID2 manufactured by Rigaku Corporation, compressed boron nitride content value, cubic orientation value and compressed boron nitride orientation value were obtained on the basis of a cross section vertical to the first surface of the test pieces. Table 1 presents individual values thus obtained.

TABLE 1

| Sample No. | Particle diameter of hexagonal boron nitride powder (μm) | Method of press-molding | Sintering temperature (° C.) | Pressure (GPa) | Compressed boron nitride content value | Cubic orientation value | Compressed boron nitride orientation value |
|---|---|---|---|---|---|---|---|
| 1 | 0.3 | Uniform | 2100 | 9 | 0.0038 | 0.49 | 0.50 |
| 2 | 6 | Uniform | 2100 | 9 | 0.0040 | 0.51 | 0.49 |
| 3 | 16 | Uniform | 2100 | 9 | 0.0043 | 0.52 | 0.51 |
| 4 | 0.3 | Uniaxial | 2100 | 9 | 0.0037 | 0.54 | 0.56 |
| 5 | 6 | Uniaxial | 2100 | 9 | 0.0041 | 0.56 | 0.61 |
| 6 | 16 | Uniaxial | 2100 | 9 | 0.0043 | 0.58 | 0.68 |
| 7 | 6 | Uniform | 2100 | 11 | 0.0000 | 0.50 | — |
| 8 | 0.3 | Uniaxial | 2100 | 11 | 0.0000 | 0.55 | — |
| 9 | 6 | Uniaxial | 2100 | 11 | 0.0000 | 0.56 | — |
| 10 | 16 | Uniaxial | 2100 | 11 | 0.0000 | 0.59 | — |
| 11 | 6 | Uniform | 1700 | 11 | 0.0040 | 0.51 | 0.46 |
| 12 | 0.3 | Uniaxial | 1700 | 11 | 0.0036 | 0.60 | 0.64 |
| 13 | 6 | Uniaxial | 1700 | 11 | 0.0035 | 0.64 | 0.80 |
| 14 | 16 | Uniaxial | 1700 | 11 | 0.0038 | 0.70 | 1.00 |
| 15 | 16 | Uniform | 2300 | 7.7 | 0.0040 | 0.51 | 0.49 |
| 16 | 16 | Uniaxial | 2300 | 7.7 | 0.0040 | 0.54 | 0.51 |

A part of each of the obtained sintered bodies was cut out to manufacture an insert. A cutting test was conducted by using a first surface of the insert as a rake surface. Conditions of the cutting test are as follows.

<Cutting Test Conditions>

Workpiece: Ti alloy (Ti-6Al-4V)

Cutting conditions: Vc=100 m/min, f=0.1 mm/rev, ap=0.4 mm, Wet.

Tool used: CNGA120408

Any of Samples Nos. 1-3, 7, 11 and 15 being the samples obtained from the molded bodies molded under uniform pressure does not include the configuration of the boron nitride sintered body in the insert of the present disclosure. Even if using the molded body obtained by uniaxial pressing, no compressed boron nitride was included in Samples Nos. 8 to 10, whose sintering temperature was 2100° C. and sintering pressure was 11 GPa. The compressed boron nitride was included but the compressed boron nitride orientation value was smaller than the cubic orientation value in Sample No. 16 using the molded body obtained by uniaxial pressing, whose sintering temperature was 2300° C. and sintering pressure was 7.7 GPa.

Of Samples molded by uniaxial pressing, Samples Nos. 4 to 6 and 12 to 14 had a compressed boron nitride content value exceeding 0.002 and a cubic orientation value exceeding 0.5, and their respective compressed orientated values were larger than their respective cubic orientation values, thus leading to a long life. A mean particle diameter of the cubic boron nitride of each of Samples Nos. 4 to 6 and 12 to 14 was 200 nm or less. In particular, a mean particle diameter of each of Sample No. 4 and Sample No. 12, both of which used the raw material powder having a small mean particle diameter, was 100 nm or less.

Samples Nos. 5, 6, 12, 13 and 14, each having a cubic orientation value of 0.55 or more, had a longer life than Sample No. 4 having a cubic orientation value of less than 0.55. Samples Nos. 13 and 14, each having a compressed boron nitride orientation value of 0.8 or more, had a longer life than Sample No. 12 having a compressed boron nitride orientation value of less than 0.8.

Samples not satisfying configuration requirements of the present disclosure had a shorter life than Samples Nos. 4 to 6 and 12 to 14, each being the insert of the present disclosure.

The invention claimed is:

1. An insert, comprising:
   a boron nitride sintered body comprising a first surface, a second surface, and a cutting edge located on at least a part of a ridge part of the first surface and the second surface,
   the boron nitride sintered body comprising cubic boron nitride and compressed boron nitride,
   wherein
   in a transmission X-ray diffraction of a cross section of the boron nitride sintered body vertical to the first surface,
   in a direction vertical to the first surface
   X-ray intensity at a top of a 111 diffraction peak of the cubic boron nitride is IcBN(111)v, and X-ray intensity at a top of a 002 diffraction peak of the compressed boron nitride is IhBN(002)v, and
   in a direction parallel to the first surface
   X-ray intensity at a top of a 111 diffraction peak of the cubic boron nitride is IcBN(111)h, and X-ray intensity at a top of a 002 diffraction peak of the compressed boron nitride is IhBN(002)h,
   a compressed boron nitride content value indicated by (IhBN(002)v+IhBN(002)h)/(IcBN(111)v+IcBN(111)h) is larger than 0.002 and smaller than 0.01,
   a cubic orientation value indicated by IcBN(111)v/(IcBN(111)v+IcBN(111)h) is larger than 0.5, and
   a compressed boron nitride orientation value indicated by IhBN(002)v/(IhBN(002)v+IhBN(002)h) is larger than the cubic orientation value.

2. The insert according to claim 1, wherein the cubic orientation value is 0.55 or more.

3. The insert according to claim 1, wherein the compressed boron nitride orientation value is 0.8 or more.

4. The insert according to claim 1, wherein the boron nitride sintered body comprises Wurtzite boron nitride.

5. The insert according to claim 1, wherein a mean particle diameter of the cubic boron nitride in the cross section is 200 nm or less.

6. A cutting tool, comprising:
   a holder having a length from a first end to a second end and comprising a pocket on a side of the first end; and
   the insert according to claim 1, the insert being located in the pocket.

\* \* \* \* \*